Aug. 18, 1936.  J. F. McCANN  2,051,770
FLEXIBLE COUPLING
Filed June 24, 1935
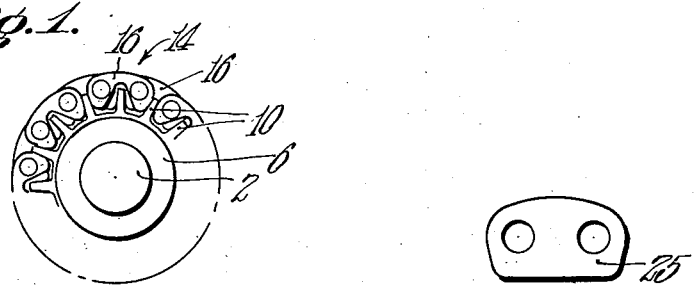
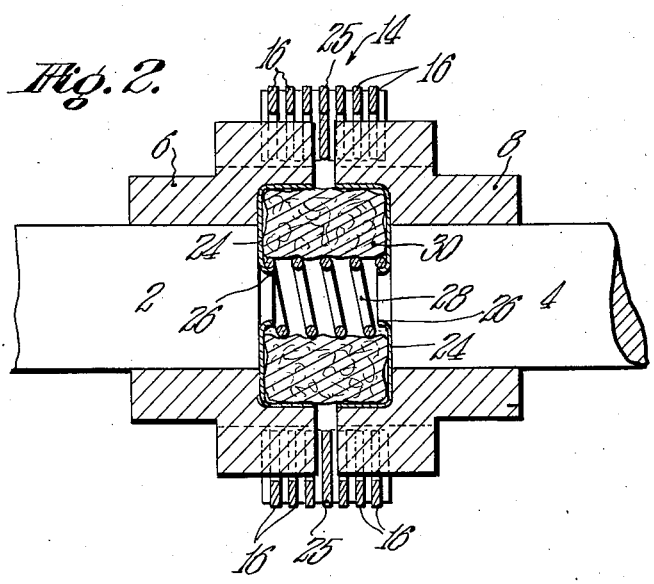
INVENTOR.
John F. McCann.
BY Walter C. Ross.
ATTORNEY.

Patented Aug. 18, 1936

2,051,770

UNITED STATES PATENT OFFICE 2,051,770

FLEXIBLE COUPLING

John F. McCann, Springfield, Mass., assignor to Baldwin-Duckworth Chain Corporation, Springfield, Mass., a corporation of Massachusetts Application June 24, 1935, Serial No. 28,147

2 Claims. (Cl. 64—19)

This invention relates to improvements in couplings and is directed more particularly to couplings for connecting together the ends of shafts.

One object of the invention is the provision of a flexible coupling for shafts and the like and consisting of half-couplings which are preferably in the form of toothed sprockets having an endless chain engaging the teeth thereof. The coupling is so constructed and arranged that when the half-couplings are secured to the adjacent ends of shafts, one shaft is driven by the other in exact synchronism without appreciable torsional deflection while at the same time the coupling structure accommodates itself to misalignment or relative axial movements of the shafts.

As one special feature of the invention yielding means is provided in connection with the coupling structure to prevent the coupling members or shafts contacting with one another by axial movements of one or the other such as is brought about by end play. As another feature means is provided for supplying lubricant to the coupling parts, preferably in the form of a pad capable of holding lubricant, all to the end that the coupling not only possesses extreme flexibility but the parts may be well lubricated.

Various other objects and advantages of the invention will be hereinafter more fully referred to in connection with the following description of the preferred form thereof, reference being had to the accompanying drawing wherein:

Fig. 1 is a side elevational view of a coupling embodying the novel features of the invention;

Fig. 2 is a longitudinal sectional view at a larger scale through the coupling shown in Fig. 1; and Fig. 3 is a side elevational view at a large scale of a stop link.

Referring now to the drawing more in detail the invention will be described in detail.

The adjacent ends of separate shafts are represented at 2 and 4 which may be the shafts of different units it is desired to couple together. Ordinarily where the shafts of separate units are coupled together there is likely to be more or less axial movements of one or both of the shafts and it is usually difficult to insure accurate axial alignment thereof. According to this invention there is provided a coupling which is adapted to accommodate itself to more or less misalignment and such end play of the shafts as is commonly present.

Half couplings 6 and 8 are affixed in some suitable manner to the ends of the shafts 2 and 4 and these are preferably in the form of sprockets having peripheral teeth such as 10.

An endless chain 14 is wrapped around the sprocket which may consist of rows of links 16 pivoted together, as is usual, by pins or the like. In the form of the invention shown, the chain 14 is of the silent type but chains of other forms may be employed, if desired, and, as usual, the chain is interlocked with the teeth of the half couplings so that one coupling and its shaft are driven by the other.

The chain 14 preferably has one or more of its intermediate links arranged in the form of stops which may be called stop links 25 as shown clearly in Fig. 3. With the chain 14 wrapped around the sprocket members which are spaced apart more or less as shown in Fig. 2, the stop links 25 are disposed between adjacent inner faces of the sprockets 6 and 8 to prevent the chain from moving axially to any appreciable extent whereby it does not become disengaged from the sprockets.

The half coupling or coupling members and chain are so constructed and arranged that the shafts may move axially relative to one another and at the same time assume a more or less misaligned relation since the half couplings are spaced from one another while at the same time the chain and sprockets provide a positive driving connection so that one shaft and its coupling act as a driver for the other.

Discs 24 are provided which may be disposed in sockets on the adjacent inner faces of the half couplings 6 and 8 and spring seats such as shown are formed therein as by flanges 26.

A yielding means in the form of a compression spring 28 is under more or less compression between the members 24 and is centralized and held in place by means of the members 26. This spring 28 is arranged and adapted to resist movements of the coupling members and shafts towards one another and as one shaft or the other moves axially or as one or the other or both the shafts are tilted, the said yielding means prevents the sprockets or coupling members from coming into contact with one another. This is always desirable not only to obviate noise but to eliminate the possibility of vibrations being transmitted from one shaft to the other as well as for other reasons.

To provide lubricant for the contacting parts of the chain and sprocket teeth, etc., there is provided a lubricant, containing member 30 which is disposed between the disc members 24 and around the spring 28. This member 30 may be made in the form of wool or any other material capable of containing a supply of lubricant.

This member 30 as the coupling members and shafts move relative to one another is squeezed to some extent between the half-couplings whereby the lubricant therein is caused to be expelled therefrom. Also, of course, more or less lubricant will be thrown from the member 30 as the coupling structure is rotated. The function of the member is primarily to contain a supply of lubricant and it is not necessarily intended to act as a yielding cushion to prevent contacting of the coupling members.

In cases where fibrous yielding material is disposed between the coupling members to act as a cushion and thereby subjected to the pressing action thereof, as they move toward one another, the said material soon deteriorates to the extent that it becomes hard, less porous, and quite incapable of containing a supply of lubricant.

So that the member 30 in my construction may maintain its lubricant-containing qualities and not function as a cushion or yielding member it is not subjected to any appreciable pressure. The yielding means in the form of a spring is provided which functions to act as a cushion between the coupling members thereby relieving the member of the necessity of acting on a yieldable cushion.

While I have described the invention in great detail and with respect to a preferred form thereof, it is not desired to be limited thereto since many changes and modifications may be made therein without departing from the spirit and scope of the invention. What it is desired to claim and secure by Letters Patent of the United States is:

1. A flexible coupling structure comprising in combination, a pair of rotatable shafts, adjacently disposed half-couplings having annular teeth on said shafts, an endless chain engaging the teeth of said pair of half-couplings whereby they are operatively connected together, said half-couplings being provided with sockets in their adjacent faces, a yielding coil spring arranged in axial alignment with said half-couplings and having opposite end parts disposed in said sockets, and a lubricant-containing pad of relatively resilient material concentrically arranged relative to said spring and disposed between said half-couplings, the said spring arranged to offer relatively greater resistance to the movement of said half-couplings toward one another than does the said pad, whereby said spring resists movements of the half-couplings while said pad is pressed thereby only to release lubricant.

2. A flexible coupling structure comprising in combination, a pair of rotatable shafts adjacently disposed half-couplings having annular teeth on said shafts, an endless chain engaging the teeth of said pair of half-couplings whereby they are operatively connected together, said half-couplings being provided with sockets in their adjacent faces, a disc member in each of said sockets, a yielding coil spring arranged in axial alignment with said half-couplings and having its opposite ends in engagement with said disc members to urge the couplings away from one another and to yieldingly resist movements thereof towards one another, and a lubricant-containing pad of relatively resilient material between said disc members and adapted to release lubricant when pressed upon by movements of said half-couplings towards one another, the said discs having means to center said spring and the said pad and spring being relatively concentrically disposed.

JOHN F. McCANN.